United States Patent [19]

Natarajan

[11] Patent Number: 5,010,480

[45] Date of Patent: Apr. 23, 1991

[54] COMMUNICATION INTERFACE FOR INTERFACING A DATA BUS OF A COMPUTER TO A HIGH SPEED BIPOLAR COMMUNICATION SYSTEM

[75] Inventor: T. Raj Natarajan, Plano, Tex.

[73] Assignee: DSP Technology, Carrollton, Tex.

[21] Appl. No.: 76,171

[22] Filed: Jul. 21, 1987

[51] Int. Cl.$^5$ .............................................. G06F 3/00
[52] U.S. Cl. ................................. 364/200; 364/222.1; 364/239; 364/239.3
[58] Field of Search ................ 364/200, 900 MS File; 370/61, 84, 58, 85, 110.01; 340/825.04

[56] References Cited

U.S. PATENT DOCUMENTS

| | | | |
|---|---|---|---|
| 4,161,786 | 7/1979 | Hopkins et al. | 364/200 |
| 4,229,815 | 10/1980 | Cummiskey | 370/84 |
| 4,387,424 | 6/1983 | Frediani et al. | 364/200 |
| 4,393,464 | 7/1983 | Knapp et al. | 364/900 |
| 4,450,556 | 5/1984 | Boleda et al. | 370/58 |
| 4,745,624 | 5/1988 | Mantovani et al. | 375/17 |
| 4,748,637 | 5/1988 | Bishop et al. | 370/84 |
| 4,748,656 | 5/1988 | Gibbs et al. | 364/900 |
| 4,755,929 | 7/1988 | Outous et al. | 364/200 |

OTHER PUBLICATIONS

"Digital Data System Channel Interface Specification." Bell System Technical Reference, PUB. 62310, Sep. 1983.
AT&T Pub. No. 41458.

Primary Examiner—Raulfe B. Zache

[57] ABSTRACT

A Digital Service (DS) interface interfaces a Personal Computer (PC) to the DS directly at the PC's data bus. The DS interface has independent transmit and receive memories for transmitting and receiving the digital data at high speeds. FIFO memories buffer data between the PC's data bus and the DS interface prior to being converted to bipolar digital signals before transmission and after being received and converted to amplitude discrete digital signals from bipolar digital signals.

16 Claims, 5 Drawing Sheets

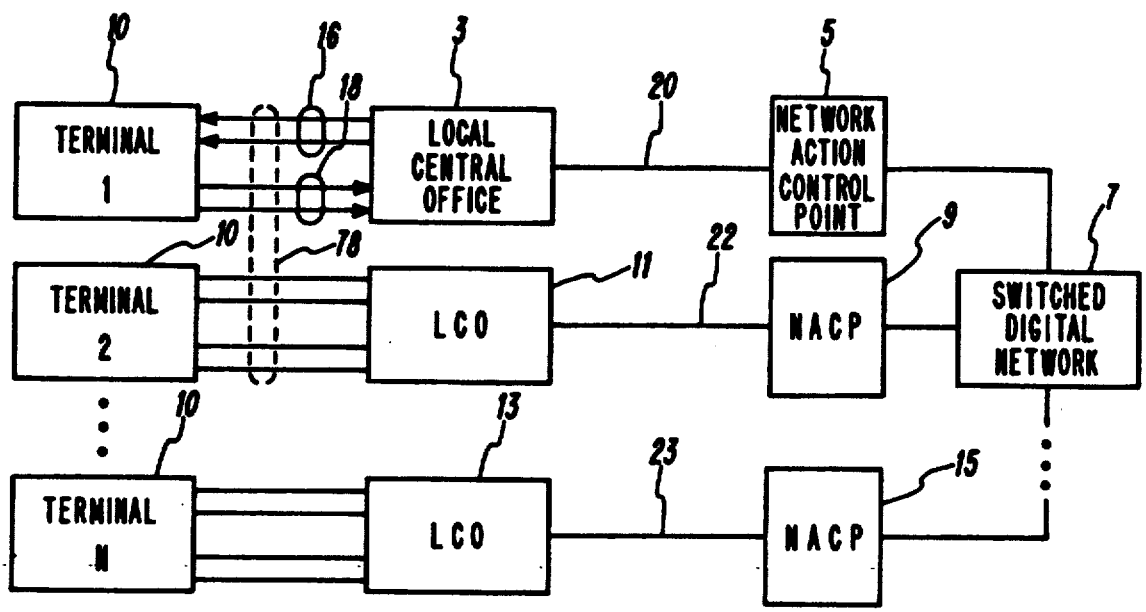
FIG. 1
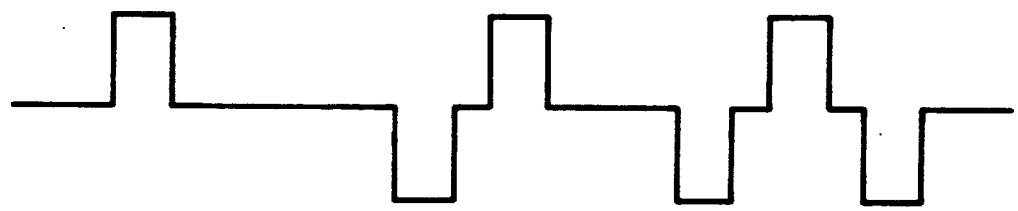
FIG. 2A  BIPOLAR SEQUENCES
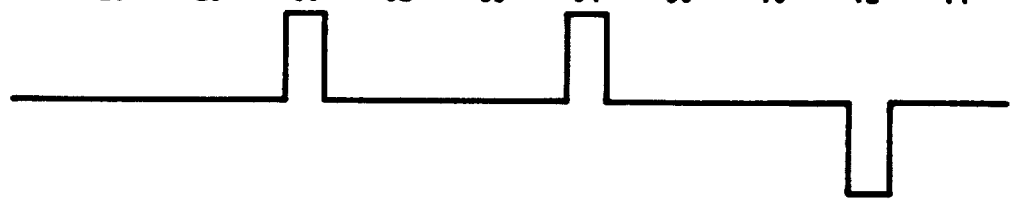
FIG. 2B  BIPOLAR VIOLATION SEQUENCES

RECEIVE VIOLATION DETECTOR
47 OF FIG. 4

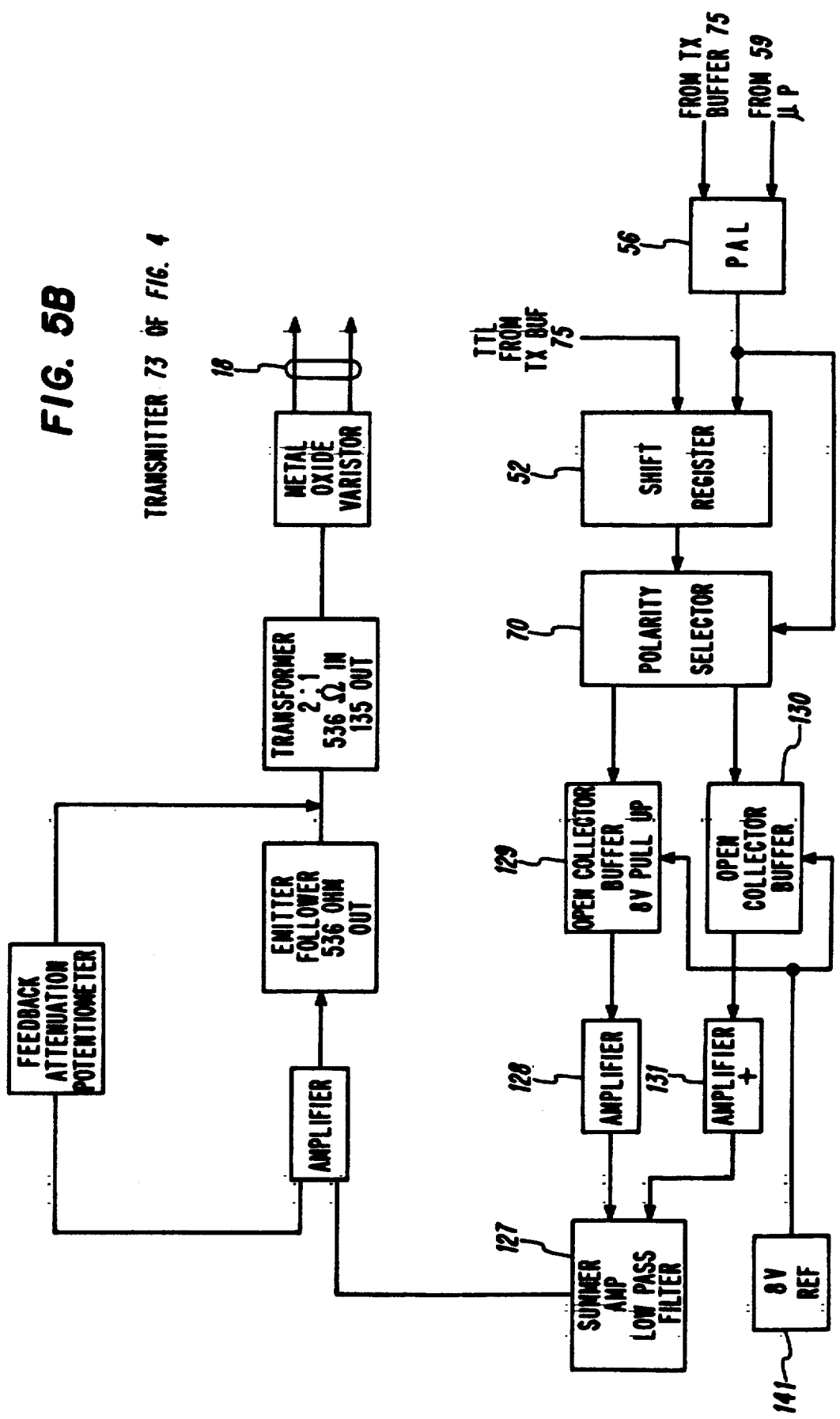

100
COMMUNICATION INTERFACE FOR INTERFACING A DATA BUS OF A COMPUTER TO A HIGH SPEED BIPOLAR COMMUNICATION SYSTEM

Appendix A is a microfiche appendix of 43 frames.

BACKGROUND OF THE INVENTION

This invention relates to communication interfaces that interface the data bus of a computer to a high speed bipolar digital communication system.

With the use of Personal Computers (PC's) as multifunction work stations including communication terminals the need for high speed data links is very great. Typically most communication links between PCs are analog links that operate at either 1200, 2400 and with special lines even at 9600 baud.

The long distance operators such as AT&T are establishing a high speed data link for bipolar digital data transmission at speeds of 56 Kilobauds. Since most computer data signals are not bipolar, digital data must be converted to high speed bipolar digital signals to operate over the new high speed data links. This is currently being performed by stand along boxes which interface to the PC via its input/output interface connectors such as RS 232 and V.35 standard interfaces losing some of the advantages of high speed transmissions. Additionally there is a cost disadvantage when an interface is implemented using one of the standard connectors.

SUMMARY OF THE INVENTION

A Digital Service (DS) interface interfaces a PC to the DS directly at the PC's data bus. The DS interface has independent transmit and receive memories for transmitting and receiving the digital data at high speeds. FIFO memories buffer data between the PC's data bus and the DS interface prior to being converted to bipolar digital signals before transmission and after being received and converted to amplitude discrete digital signals from bipolar digital signals.

The DS interface also provides control sequence detection and executes loop back test sequences.

It is the objective of the invention to provide an interface between a PC and a DS channel for high speed digital transmission.

It is another object of the invention to provide a DS interface that interfaces directly into the PC at its data bus.

These and other objects and advantages will be apparent from a reading of the specification in conjunction with the figures in which:

BRIEF DESCRIPTION OF THE FIGURES

FIG. 1 is a block diagram of a high speed communication system according to the invention.

FIGS. 2A and 2B are waveform diagrams illustrating bipolar digital signals;

FIG. 5A and 5B are block diagrams of the analog portion of FIG. 4; and

DETAILED DESCRIPTION OF THE PREFERRED EMBODIMENTS

Figure 3:
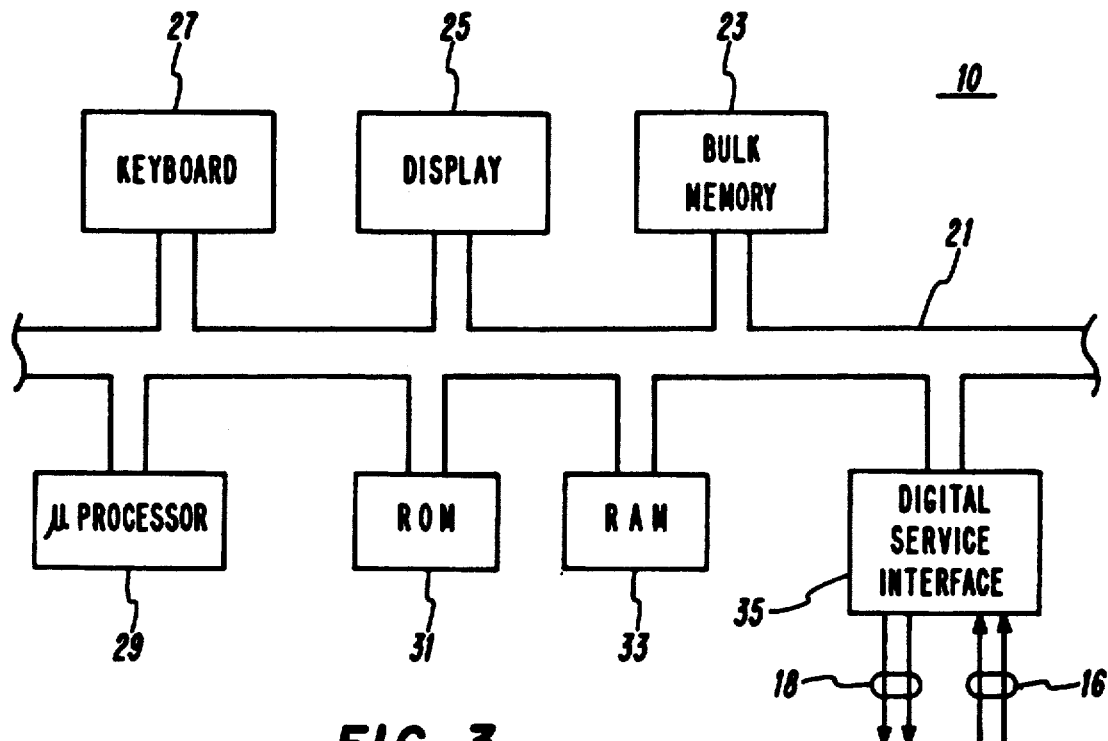
FIG. 3 is a block diagram of a terminal used in the system of FIG. 1.

FIG. 1, to which reference should now be made, is a block diagram of a digital data system that is interconnected to provide digital service such as that defined in the "Bell System Technical Reference" entitled Digital Data System Channel Interface Specification", Dated September 1983 and noted as Bell System publication 62310 and "AT&T Technical Reference" entitled Special Access Connections to the AT&T Communications Network for New Service Applications', dated October 1985 and noted as AT&T publication 4145A. A plurality of terminals 1 through N are connected via data lines 16 and 18 to a local central offices LCO's 3, 11 and 13 respectively. Each local central office 3, 11 and 13 is connected to a network Action Control Point (ACP) 5, 9 and 15 respectively. The network action control points 5, 9 and 15 are connected to a switch digital network 7, which provides switched connectors for connecting each terminal 10 to a called terminal that is a member of the plurality of terminals 1 through N. Each terminal 10 in the preferred embodiment is a device such as a Personal computer that is MS-DOS driven, MS-DOS refers to an operating system provided by Microsoft Corp.

Each terminal 10 interfaces to local central office 3, 11 or 13 via a receive line 16 and a transmit line 18. There are two types of data transmitted over the receive line 16 and transmit line 18.

FIG. 2A represents how time discrete digital data in a bipolar format without violation is transmitted, in particular, logic ones are transmitted at time spaces 2, 8, 10 14, 20 and 22. Logic zeros are transmitted at 4,6, 12 and 24.

FIG. 2B illustrates a violation indication during the transmission of the discrete digital data in a bipolar format as specified in the AT&T publication 62310. The violation indication is used for transmitting control sequences between terminals 10. A control sequence is defined as violation sequence, V, in which as an example a logic 1 will occur in the positive direction or in the same direction as the preceding logic one. A non-violation sequence such as that shown in FIG. 2A is one in which a logic 1 toggles around the zero axis. Consequently at time space 34 there is a violation indication.

Violations are generally used to indicate one of three control sequences. For example an idle is an control sequence that in the transmit mode indicates that the terminal 10 has no data to transmit and thus is identified as being on hook. Another violation sequence is the zero suppression sequence. When there is a plurality of logic zeros to be transmitted over the transmit line 18 a periodic violation is transmitted for clock recovery. Also a test code is defined in the above reference publication. Therefore the violation sequences that are provided on the receive lines 16 includes idle, that is no data to receive, zero suppression sequence and a special test sequence called loop back sequence wherein the data is looped back on itself to the transmit channel of the terminal 10.

FIG. 3 is a block diagram of the terminal 10 and as discussed earlier is an MS-DOS driven computer such as a machine manufactured by IBM corporation noted as the IBM-PC/AT or IBM-PC/XT. The terminal includes a microprocessor 29 which is connected to a data bus 21. The microprocessor 29 controls the interchange of data on the data bus 21 in response to programs either inputted from the bulk memory 23, the RAM 33 or from a ROM 31. Additionally, communications with the microprocessor 29 is provided to an operator via keyboard 27 and a display 25. The bulk memory 23 includes devices such as disk, hard disk drive or tape drive and is connected and interfaced to the data bus 21. When data is to be transmitted a DS interface 35 is provided and interfaces the data bus 21 to the receive line 16 and the transmit line 18. The advantage of this connection is the data bus 21 is a bidirectional high speed data bus and interfaces directly to the DS interface 35. Usually this transfer speed is 8 megabits per second.

Figure 4:
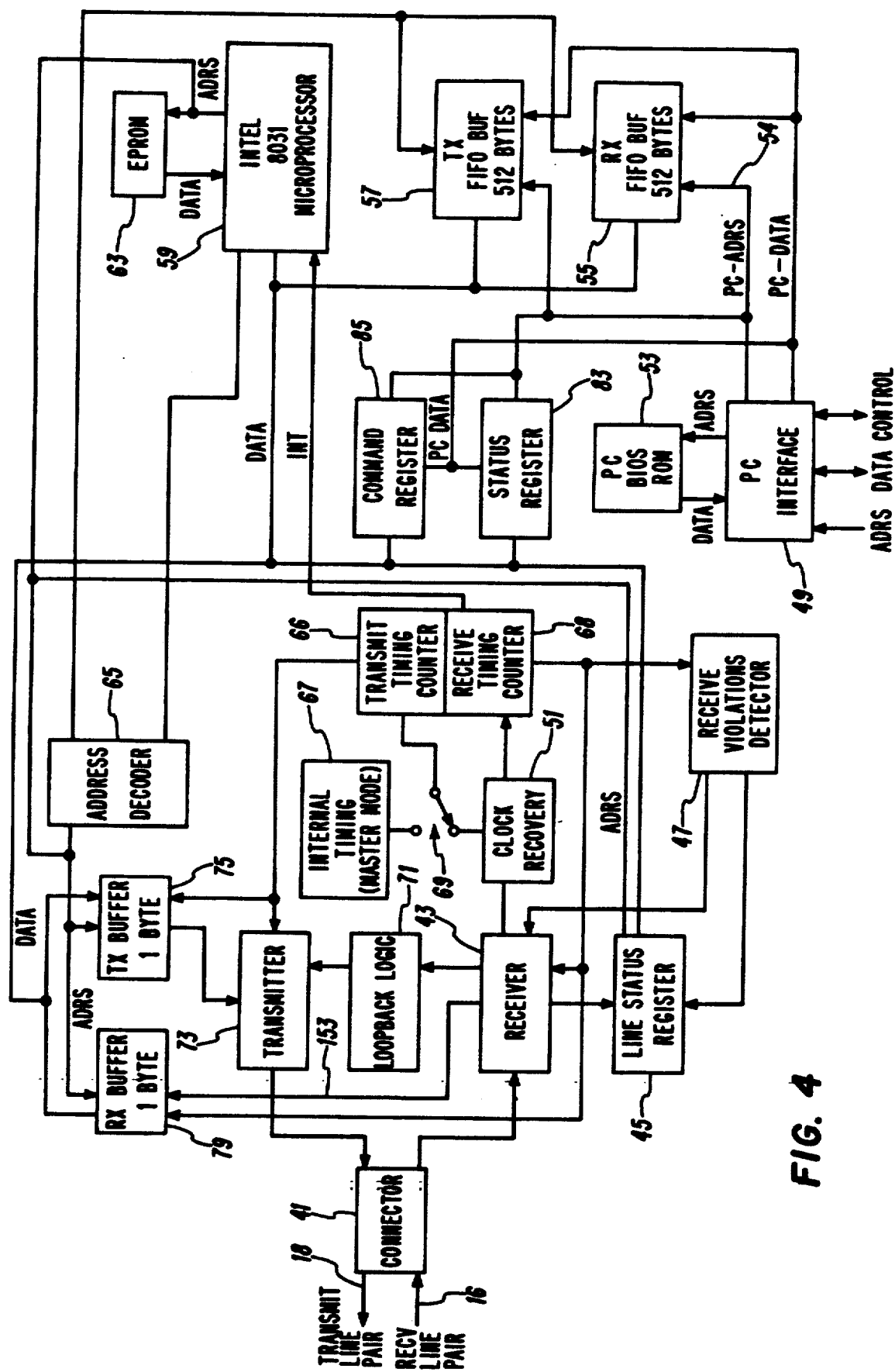
FIG. 4 is a block diagram of the DS interface of FIG. 3.

In FIG. 4, to which reference should now be made, there is illustrated a block diagram of the DS interface 35. In the embodiment of FIG. 4 the DS interface 35 is designed to interface directly on the data bus 21 of an IBM PC, either the XT or AT model through a spare card slot. This is done by a 60 pin connector which is connected to a PC interface 49. The PC interface 49 is under the control of a program stored in the ROM 53 which should be noted as the BIOS which is the Base Input/Output system of transferring data, control and status and the DS interface 35 and the microprocessor 29. Received data from the DS is supplied to the PC under the control of the microprocessor 29.

The transmit data is transferred from the data bus 21 via the IBM interface 49 and loaded into a FIFO memory 57 under the control of the microprocessor 29 which additionally provides addresses by the addresses BUS 54 to the RX FIFO memory 55. A microprocessor 59 which is internal to the DS interface 35 controls the unloading of data from the TX FIFO memory 57 and the loading of data to the RX FIFO memory 55 by its data and address buffers. The microprocessor 59 is under control of an 8 kilobyte EPROM 63 which has stored therein the program listed in appendix A.

A decoder 65 receives addresses from the microprocessor 59 and decodes the addresses and directs the addresses to either the TX FIFO memory 57, the RX FIFO memory 55, a RX buffer 79, a TX buffer 75, a line status register 45, PC command register 85 or PC status register 83. Digital service timing for the DS interface 35 is provided by the DS timing clock recovery circuit 51 which recovers the clock from the data that is provided on the receive line 16. The DS timing clock recovery circuit 51 is a clock generator, that is in sync with the recovered clock from the bipolar digital signals such as those illustrated in FIGS. 2. An internal timing clock 67 may be used when the switch 69 is connected to provide the timing sequence to the transmit timing counter 66. In this case the DS interface 35 is a master station and can be used to talk to another terminal directly using its internal clock system such as terminal 1 being interfaced directly to terminal 2 via an alternate data link 78 of FIG. 1. In normal operation the timing is provided for both transmit and receive modes by the timing clock recovery circuit 51. The transmit timing counter 66 and receive timing counter 68 which by counting the recovered clock pulses provide an interrupt to the microprocessor 59 each time a byte of data is transmitted or received.

Figure 5A:
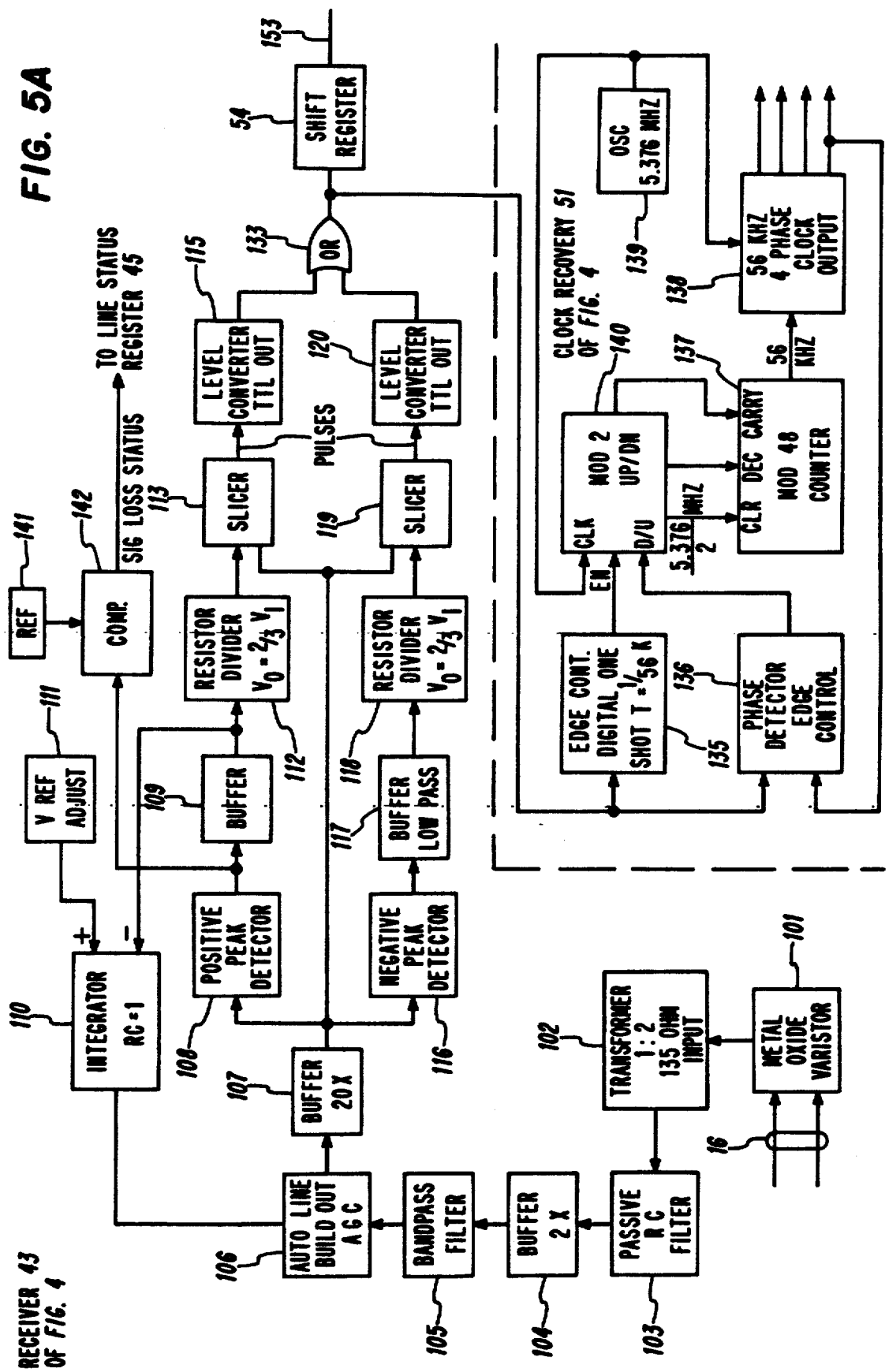

The transmit timing counter 66 in addition to providing an interrupt to the microprocessor 50 provides a shift clock to the shift register 52 in the transmitter 73 of FIG. 5, and an unload clock to the TX buffer 75. The receive timing counter 68 in like manner provides an interrupt to the microprocessor 59, a shift clock to the shift register 54 of FIG. 5 for shifting the received data to the RX buffer 79, a load clock for loading each received byte of data in the RX buffer 79, and clock pulses that are in sync with the received data to the receive violation detector 47.

When data is transmitted, a transmitter 73 receives the data from a one byte buffer, TX buffer 75, and converts this received data from TTL logic signals to bipolar logic signals and applies the converted data to the transmit line 18 via a connector 41. When data is received a receiver 43 receives the bipolar data from receive line 16 via connector 41 and converts this bipolar data into TTL data (TTL stands for Transistor Transistor Logic), and stores the data in the receive buffer 79 which is in the embodiment of FIG. 4 is a one byte buffer. Additionally the receiver 43 provides status to a line status register 45 indicating the presence of a control sequence or the loss of a signal.

The receiver 43 also interfaces with a receive violation detector 47 which detects when there is an idle condition and provides that status to the status register 45. The received violation detector 47 additionally detects a zero sequences and passes a decoded zero sequence to the receiver 43 for storage in the one byte buffer 79. The final function that is provided by the receive violation detector 47 is a loop back sequence in which case this status is provided by the violation detector 47 to the line status register 45 which passes this information to the microprocessor 59.

It is the microprocessor 59 that initiates the loop back sequence by activating the loop back logic 71 which acts as a switch and connects the output of the receiver 43 to the input of transmitter 73 for retransmitting a test sequence via connector 41 and the transmit line 18 thus performing the loop back operation.

The command register 85 stores the receive command from the microprocessor 29 and provides in a status register 83 status of the DS interface 35 to the microprocessor 29.

When an application program in terminal 10 begins a communication sequence to communicate to another terminal, the microprocessor 29 sends a command to the command register 85 which notifies the microprocessor 59 to establish communication to a remote and provide the 10 digit directory number of the remote terminal to the TX FIFO buffer 57. The microprocessor 59 transmits the called number to the network action point using the procedure described in the AT&T publication 41458 which is incorporated herein by reference. After the communication to the remote terminal is established, the status of the DS interface 35 is provided by the microprocessor 59 to the microprocessor 29 via status register 3. The microprocessor 29 then loads the TX FIFO buffer 57 at the data transfer rate of the data bus 21 with the first 512 bytes of data to be transmitted. The TX FIFO buffer 57 is then unloaded one byte at a time into the TX buffer 75 until all of the 512 bytes of data have been transmitted.

In the receive mode of operation, the receiver 43 receives and converts the received bipolar data form the receive lines 16 to receive digital data for loading one byte at a time into the RX buffer 79. The clock recovery circuit 68 recovers the timing pulses from the bipolar digital signal and passes this recovered clock to the receive timing counter 68. The receive timing counter 68 provides an interrupt to the microprocessor when a byte of data is stored in the shift register 54. The microprocessor 59 in response to the interrupt issues a command via the address decoder 65 that causes the contents in the shift register 54 to be loaded in the RX buffer 79. Prior to the next byte of data being shifted into the shift register 54, the contents of the RX buffer 79 is transferred by command from the microprocessor 59 into the RX FIFO buffer 55. Up to 512 bytes of data may accumulated in the RX FIFO buffer 55 until transferred out by the microprocessor 29 via the PC interface 49 and PC BIOS program.

The receiver 43, transmitter 73 and the DS timing clock recovery circuit 51 are illustrated in FIG. 5 to which reference now should made. Looking at the receiver 43 a varistor 101 is connected to the receive pair 16 and provides lightning protection to the receiver 43. The output of the varistor 101 is applied to a step up transformer 102 and to a passive filter 103. The filtered and received signal is buffered by a buffer 104 and applied to a band pass filter 105, which passes signals have a frequency in the range of 0 through 112 kHz. Gain adjustment is provided to the band pass filter output by an Automatic Line Build Out (ALBO) AGC circuit 106. The output of the AIBO AGC circuit 106 is applied to a buffer 107 which buffers the signal being passed to a logic detector circuits.

A positive peak and a negative peak channel is provided in which the positive peak channel includes a positive peak detector 108 that detects positive peak signal levels, buffer 109, resistor divider 112 and a slicer 113 which compares the peak detected signal to the output of the buffer 107. Similarly the negative peak channel includes a negative peak detector 116 that detects the negative peak signal levels and applies its output to a low pass filter 117 or buffer and to a resistor divider which provides a reference to a slicer 119 which compares the negative peak to the output with the output of buffer 107. Level convertors 115 and 120 converts the output of the slicers 113 and 119 to TTL logic levels for application to the receive buffer 79 and the receiver violation detector 47. It should be noted that the peak detector channels provide a reference to the slicer for comparing the buffer 107 and this reference voltage then determines when there is a logic one present either in the positive direction or the negative direction. A feedback circuit from the buffer low pass filter 109 is applied to an integrator 110 where it is integrated along with a voltage reference 111 to generate and the AGC control signal for controlling the AIBO AGC circuit 106.

Status is applied to the line status register 45 from the comparison of the output of the positive peak detector 108 with the reference level 141 by comparator 142 and indicates to the line status register 45 when a signal is lost.

The timing circuit receives the TTL output from the an "OR" gate 133. The output the "OR" gate 133 is additionally supplied to an edge control digital one shot 135 having a time period of T=1/56,000 second. The output of the "OR" gate 133 is additionally is supplied to an edge control phase detector 136.

The output of the one shot 135 and the output from the edge control phase detector 136 is applied to a digital phase lock loop 140 which is driven by a free running oscillator 139 and provides a 5.376 mHz dived by 2 signal to a counter 137 which divides the output of the phase lock loop 140 to 56 kHz. The counter 137 is a modulo 148 divider. The output of the modulo 148 divider 137 is applied to a clock phase generator 138 which provides four phases of the 56 kHz clock one of which is fed back to the phase detector edge controller circuit 136 which compares the phase of the output of the 4 phase clock output 138 to the output of the "OR" gate 133. This insures that the clock from the phase lock loop 140 is in sync and locked into the data as provided from the "OR" gate 133.

The transmitter receives the output from the loop back logic 171 or the output from the TX buffer 75 and applies it to a polarity selector 70 which toggles logic signals between two open collector buffer and pull up circuit 129 and open collector buffer pull up circuit 130. Prior to the polarity selector 70, a Programmable Array Logic (PAL) 56 checks the TTL data and causes the polarity selector 70 to provide a zero suppression if any byte of data is all logic zeros or to transmit an idle sequence if commanded to do so by the microprocessor 59. The output of the open collector buffer 129 is applied to an amplifier 128 ; whereas the output of the open collector buffer pull up circuit 130 is applied to an amplifier 131. The outputs of the amplifier 128 and 130 are applied to a summer and low pass filter circuit 127 which is connected via its output to a difference amplifier 125. The difference amplifier 125 has a negative feedback in which its output is applied to an emitter follower 124 which in turn feeds a feedback attenuator 127 and returns to the negative input of the amplifier 125.

The output of the emitter follower 124 is connected to a impedance matching transformer 123 which is a step down transformer and is applied to the transmit line 18 via a connector 141 which interfaces to the varistor 121 which protects the transmitter from high voltage transients on the line 18.

Figure 6:
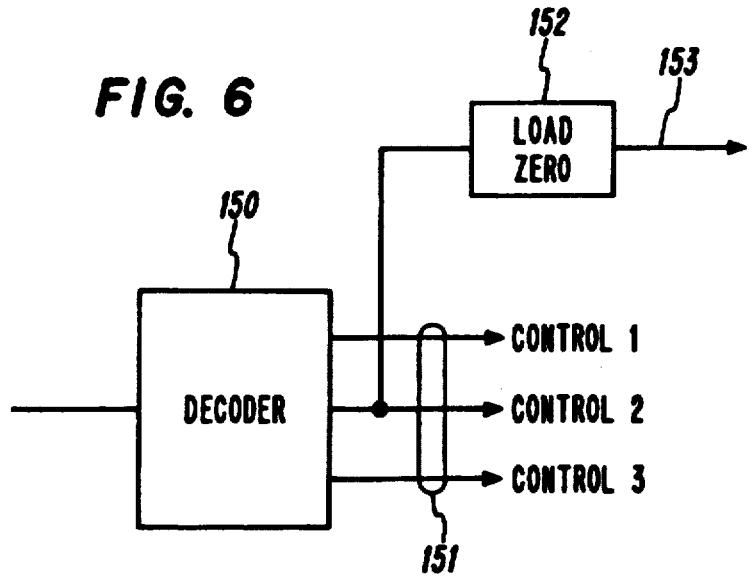
FIG. 6 is a block diagram of the receive violation detector of FIG. 4.

FIG. 6 to which reference should now be made is a simplified block diagram of the receive violation detector 47 which includes a decoder 150. The decoder 150 decodes the control one signal, the idle signal, the control two signal, the zero sequence signal and the control three signal, which is the loop back signal. When control two is detected then a zero circuit 152 loads a zero indication into the receive buffer 79 via the receiver 43. Control 3 is the loop back control which causes as was discussed earlier the loop back logic to connect to the receiver 43 into the input of the transmitter 73 for looping back over the transmit lines.

Accordingly, I claim:

1. A digital interface for interfacing a Personal Computer data bus directly to a digital service used for transmitting and receiving digital data, the digital interface comprises:

a first digital format receiver interfacible to the digital service and includes a first digital format to a second digital format converter;

a first digital format transmitter interfacible to the digital service and includes a second digital format to a first digital format converter;

transmit buffer operatively connected between the Personal Computer data bus and the first digital format transmitter;

receiver buffer operatively connected between the Person Computer data bus and the first digital format receiver; and a control system operatively connected to the first digital format receiver, first digital format transmitter, transmit buffer and receiver buffer and includes a clock recovery circuit operatively connected to the first digital format receiver for recovering a clock signal from the digital data having the first digital format.

2. The digital interface according to claim 1 further comprising:
a violation circuit operatively connected to the digital format receiver for detecting violation sequences.

3. The digital interface according to claim 2 wherein the transmit buffer comprises:
a first buffer operatively connected to the personal computer data bus; and
a second buffer operatively connected between the first buffer and the first digital format transmitter.

4. The digital interface according to claim 3 wherein the receive buffer comprises:
a third buffer operatively connected to the Personal Computer data bus; and
a fourth buffer operatively connected between the third buffer and the first digital format receiver.

5. The digital interface according to claim 1 wherein the transmit buffer comprises:
a first buffer operatively connected to the Personal Computer data bus; and
a second buffer operatively connected between the first buffer and the first digital format transmitter.

6. The digital interface according to claim 5 wherein the receive buffer comprises:
a third buffer operatively connected to the Personal Computer data bus; and
a fourth buffer operatively connected between the third buffer and the first digital format receiver.

7. A digital interface for interfacing a data bus of a Person Computer directly to a digital service used for transmitting and receiving digital data, the digital interface comprises:
a first format receiver means for receiving digital data in a first digital format from the digital service and for converting the first digital format to a second digital format;
a first digital format transmitter means for transmitting digital data in the first digital format to the digital service and for converting the second digital format to the first digital format;
transmit buffer means operatively connected between the data bus and the first digital format transmitter means for buffering digital data before transmission;
receive buffer means operatively connected between the data bus and the first digital format receiver for buffering received and converted digital data; and
a control system means operatively connected to the first digital format receiver means, first digital format transmitter means, transmit buffer means and receive buffer means for controlling the transmission and reception of digital data between the data bus and the digital data system, the control system includes a clock recovery system for recovering a clock from the digital data having the first digital format.

8. The digital interface according to claim 7 further comprising:
a violation circuit operatively connected to the digital format receiver for detecting violation sequences.

9. The digital interface according to claim 8 wherein the transmit buffer means comprises:
a first buffer means operatively connected to the data bus for buffering digital data from the data bus; and
a second buffer means operatively connected between the first buffer means and the first digital format transmitter means for buffering data from the first buffer means before transmission by the first digital format transmitter means.

10. The digital interface according to claim 9 wherein the receive buffer comprises:
a third buffer means operatively connected to the data bus for buffering digital data prior to application to the data bus; and
a fourth buffer means operatively connected between the third buffer means and the first digital format receiver means for buffering received and converted digital data prior to application to the third buffer means.

11. The digital interface according to claim 10 wherein the control system comprises:
a first computer means operatively connected to the clock recovery circuit for counting each recovered clock pulse; and
a microprocessor means operatively connected to an output of the first counter means and the first, second, third and fourth buffer means for controlling the loading and unloading of digital data into the first, second, third and fourth buffer means.

12. The digital interface according to claim 7 wherein the transmit buffer means comprises:
a first buffer means operatively connected to the data bus for buffering digital data from the data bus; and
a second buffer means operatively connected between the first buffer means and the first digital format transmitter means for buffering data from the first buffer means before transmission by the first digital format transmitter means.

13. The digital interface according to claim 12 wherein the receive buffer comprises:
a third buffer means operatively connected to the data bus for buffering digital data prior to application to the data bus; and
a fourth buffer means operatively connected between the third buffer means and the first digital format receiver means for buffering received and converted digital data prior to application to the third buffer means.

14. The digital interface according to claim 13 wherein the control system comprises:
a first counter means operatively connected to the clock recovery circuit for counting each recovered clock pulse; and
a microprocessor means operatively connected to an output of the first counter means and the first, second, third and fourth buffer means for controlling the loading and unloading of digital data into the first, second, third and fourth buffer means.

15. A method for interfacing a data bus of a Personal Computer to a digital service, the method comprises:
receiving digital data having a first digital format from the digital service; converting the received digital data from the first digital format to a second digital format;
buffering the converted received digital data prior to transferring to the data bus;
buffering transmit digital data from the data bus having the second digital format prior to transmission to the digital service;
converting the buffered transmit digital data from the second digital format to the first digital format;
transmitting the transmit digital data having the first digital format to the digital service;

controlling the transmission of the transmit digital data and the reception of the received digital data between the data bus and the digital service including the steps of recovering a clock from the received digital data.

16. The method of claim 15 further comprising; detecting violation sequences of the first digital format in the received converted digital data.

* * * * *